United States Patent [19]

Collins

[11] Patent Number: 4,566,010

[45] Date of Patent: Jan. 21, 1986

[54] PROCESSING ARRANGEMENT FOR PULSE COMPRESSION RADAR

[75] Inventor: John D. Collins, Burlington, Mass.

[73] Assignee: Raytheon Company, Lexington, Mass.

[21] Appl. No.: 372,517

[22] Filed: Apr. 28, 1982

[51] Int. Cl.[4] .............................................. G01S 13/26
[52] U.S. Cl. .............................. 343/17.2 PC; 343/379
[58] Field of Search ................ 343/17.2 PC, 378, 379; 364/517; 367/100

[56] References Cited

U.S. PATENT DOCUMENTS

| | | | |
|---|---|---|---|
| 3,281,842 | 10/1966 | Cerar et al. | 343/17.2 PC |
| 3,360,769 | 12/1967 | Lord | 367/100 X |
| 3,889,199 | 6/1975 | Gutleber | 343/17.2 PC X |
| 4,153,900 | 5/1979 | Novak et al. | 343/17.2 PC |
| 4,156,876 | 5/1979 | Debuisser | 343/17.2 PC |
| 4,313,170 | 1/1982 | Lewis et al. | 343/17.2 PC X |
| 4,384,291 | 5/1983 | Lewis et al. | 343/17.2 PC |

OTHER PUBLICATIONS

Colin et al., "Pulse Compression in Radars using Binary Phase Modulation", Electrical Communication, vol. 52, No. 2, (1977), pp. 152-157.
Ackroyd et al., "Optimum Mismatched Filters for Sidelobe Suppression", IEEE Trans. Aerospace and Elec. Systems, vol. AES-9, No. 2, Mar. 1973.

Primary Examiner—Theodore M. Blum
Assistant Examiner—Gilberto Barrón, Jr.
Attorney, Agent, or Firm—Philip J. McFarland; Joseph D. Pannone

[57] ABSTRACT

An arrangement is shown to process mainlobe echo signals and range sidelobe signals in the receiver of a pulse compression radar by first converting such signals to a set of digital numbers and then correlating, number by number, such set with a set of reference numbers describing the mainlobe echo signals and the negative of selected range sidelobe signals.

2 Claims, 5 Drawing Figures

PROCESSING ARRANGEMENT FOR PULSE COMPRESSION RADAR

BACKGROUND OF THE INVENTION

This invention pertains generally to phase-coded pulse compression radars, and more particularly to an improved pulse compression technique for such type of radars to reduce range sidelobes.

As is known in the art, a long coded pulse is transmitted from a pulse compression radar and echo signals are processed to form relatively narrow received pulses. An increased detection capability is thereby achieved along with a range resolution capability approaching that of a narrow pulse radar system. In general, the long coded pulse is achieved by using either a linear frequency-modulated (FM), or chirp, waveform or a phase-coded waveform to modulate a carrier signal. A phase-coded waveform differs from an FM waveform in that the long transmitted pulse is subdivided into a number of shorter subpulses of equal time duration, with each such subpulse having a discrete phase that is changed at the Nyquist rate. In the radar receiver echo signals are processed utilizing a correlation technique to produce compressed pulses.

Of the many known phase-coded waveforms, the so-called "pseudo-random" code or "maximal-length sequence" are for use as the long coded pulse in a pulse compression radar because of the ease with which such codes may be generated and the desirability of the corresponding autocorrelation functions. Thus, a pseudo-random code may be generated in a shift register employing linear feedback whereby the contents of selected stages of such register are summed to form a coded input signal. With properly chosen feedback connections the output signal from the shift register is a sequence of maximal length. The length "N" of a maximal length sequence is equal to the number of subpulses in the sequence as well as the time-bandwidth product of the radar system.

The autocorrelation function (i.e., the ambiguity function along the range axis) of a pseudo-random code is either periodic (when the code generator is operated continuously), or aperiodic (when the code generator is operated for only a single complete sequence). When the autocorrelation function is periodic, the period may be expressed as "Nt", where N is the number of subpulses in the sequence and t is the time duration of each subpulse. The sidelobe level for such a function is constant (of unity magnitude). On the other hand, the autocorrelation function for an aperiodic sequence is characterized by a single peak of amplitude N at the origin (t=o) and a sidelobe structure having odd symmetry along the range axis.

Pseudo-random sequences may be generated by either a simple binary code wherein the phases of the subpulses alternate between 0° and 180° or by means of a polyphase code as, for example, a Frank polyphase code. In general, phase-coded waveforms are not practical in applications where high Doppler frequencies are expected because one cycle of Doppler shift during a sequence results in complete decorrelation. Even when smaller Doppler shifts may be experienced, the range resolution possible with a signal having a phase code is limited by increased sidelobe levels. Any degradation in range resolution has, of course, an adverse effect on the capability of a radar, particularly a tracking radar in a fixed emplacement. In such a radar echo signals received in range sidelobes may easily obscure desired echo signals received in the main lobe. As is known, weighting techniques may be employed to reduce range sidelobes associated with pulse compression. However, weighting reduces sidelobes by moving the sidelobe energy to widen the main lobe, thereby increasing main lobe clutter and reducing resolution of the main lobe.

SUMMARY OF THE INVENTION

With this background of the invention in mind, it is an object of this invention to provide a method for reducing range sidelobes in a phase-coded pulse compression radar.

It is another object of this invention to provide, in a phase-coded pulse compression radar, an improved pulse compression technique wherein range sidelobe control is provided with no loss in resolution in the mainlobe.

These and other objects of this invention are generally attained by providing, within the receiver of a phase-coded pulse compression radar, an improved digital correlator having N+M bits, where N is the number of samples, or bits, taken of the transmitted waveform and M is equal to the number of sidelobes adjacent to the main lobe to be cancelled. The resulting cross-correlation function has a main lobe of amplitude N, where N is the number of bits in the transmitted waveform, and a minor lobe of amplitude M, separated from the main lobe by N bits, with the first M sidelobes to the right of the main peak completely cancelled.

BRIEF DESCRIPTION OF THE DRAWINGS

Other objects and many of the attendant advantages of this invention will be readily appreciated as the same become better understood by reference to the following detailed description when considered in connection with the accompanying drawings, wherein.

DESCRIPTION OF THE PREFERRED EMBODIMENT

Figure 1:
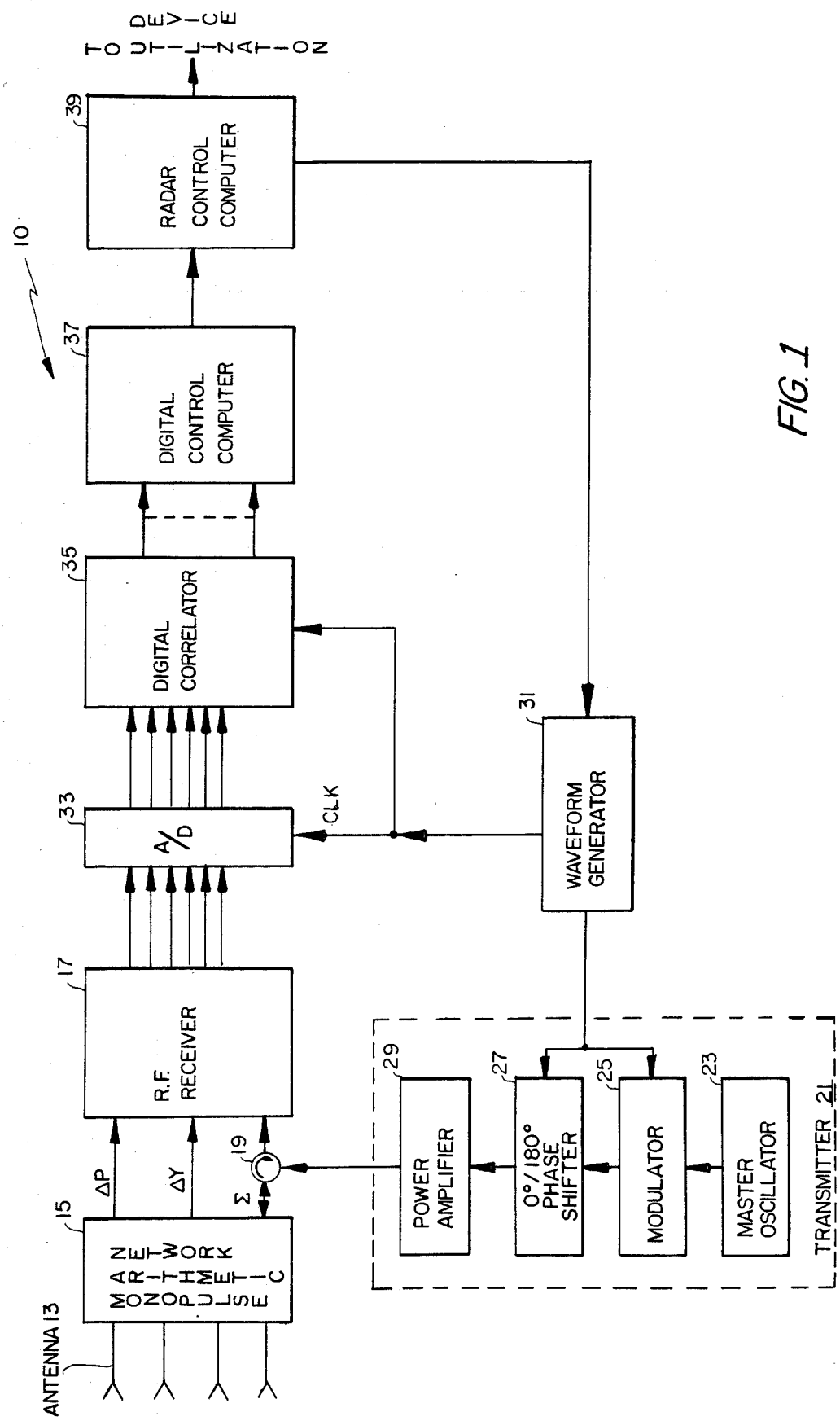
FIG. 1 is a simplified block diagram of a phase-coded pulse compression radar according to this invention.
Figure 2:
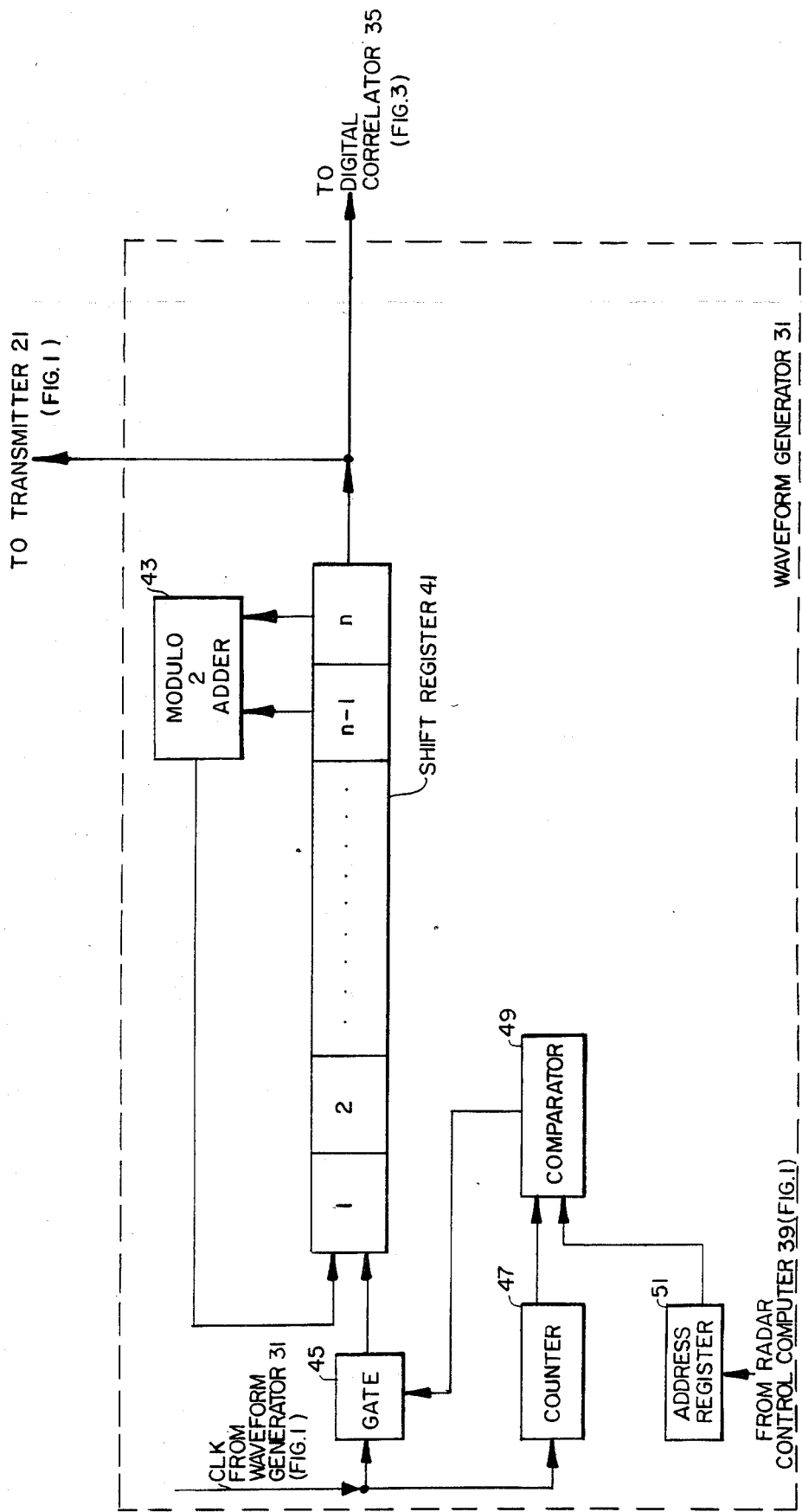
FIG. 2 is a simplified block diagram of the waveform generator of the radar system of FIG. 1.

Referring now to FIG. 1, a phase-coded pulse compression radar 10 according to this invention is shown to include an antenna 13 and a conventional monopulse arithmetic network 15. The latter is effective to form monopulse sum, pitch error and yaw error signals which are passed to a radio frequency (R.F.) receiver 17. The sum channel signal is shown to be passed to the R.F. receiver 17 via a circulator 19 which is provided to couple a transmitter 21 to the antenna 13. The transmitter 21 is shown to include a master oscillator 23, a modulator 25, a 0°/180° phase shifter 27 and a power amplifier 29. Both the modulator 25 and the 0°/180° phase shifter 27 are shown to be controlled by control signals provided by a waveform generator 31. The latter, which will be described in detail hereinbelow with reference to FIG. 2, is effective to generate a 127-bit binary code. That code is used by the modulator 25 to generate a pulse comprising 127 subpulses of equal time duration. The phase of each of the subpulses is controlled by the 0°/180° phase shifter 27 in accordance with the binary code generated by the waveform generator 31. That is to say, the binary code consists of a sequence of either logic level ones or zeroes and the phase of the transmitted signal alternates between 0° and 180° in accordance with the sequence of ones and zeroes in the binary code.

Figure 3:
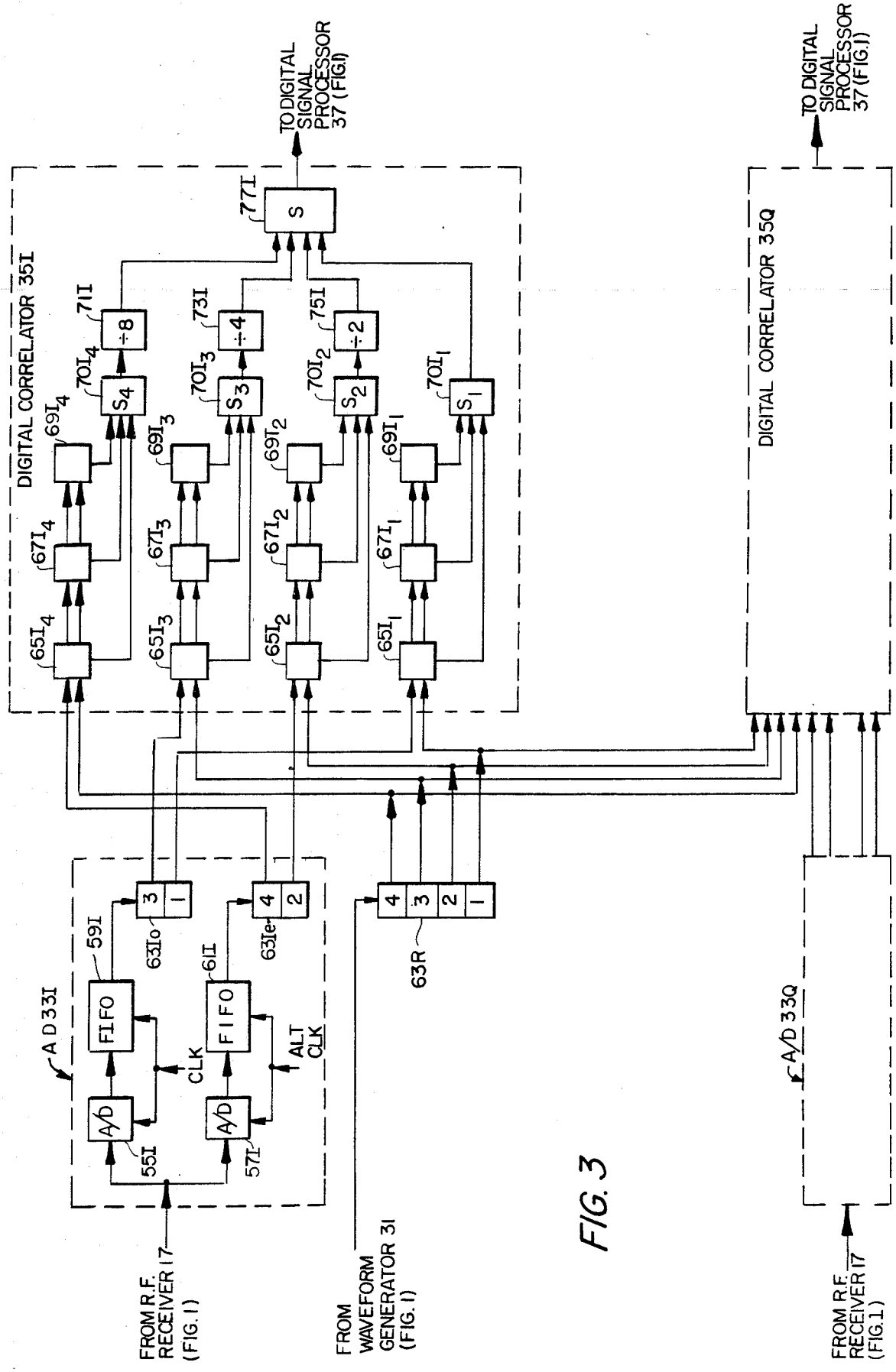
FIG. 3 is a simplified block diagram of the A/D converter and digital correlator of the radar system of FIG. 1.

The R.F. receiver 17, which is provided with a pair of local oscillator signals from the master oscillator 23, is of conventional design and is effective, inter alia, to down-convert the received signals to a suitable intermediate frequency (I.F.) and then to quadrature demodulate such I.F. signals to provide bipolar in-phase (I) and quadrature-phase (Q) output signals for each of the monopulse channels. The I and Q output signals from the R.F. receiver 17 are digitized in an analog-to-digital converter (A/D 33) and passed to a digital correlator 35. The latter, which will be described in detail hereinbelow with reference to FIG. 3, is effective to perform both pulse compression and sidelobe reduction. The I and Q output signals from the digital correlator 35 are passed to a digital signal processor 37 which, inter alia, performs spectrum analysis and target detection by means of Fast Fourier Transforming (FFT'ing) the signals out of the digital correlator 35. The signals from the digital signal processor 37 are passed to a radar control computer 39 which performs, in a conventional fashion, the tasks of target indexing and tracking as well as control of the waveform generator 31. The output signals from the radar control computer 39 are also passed to a utilization device (not shown) which may, for example, be a display unit.

Referring now to FIG. 2, the waveform generator 31 used to generate a desired binary coded waveform is shown to include a shift register 41 with "n" stages (here n=7) in which a sequence of ones and zeroes is created. It should be noted here in passing that the special case of all zeroes is not allowed as this would result in an all-zero sequence being generated. The last two stages of the shift register 41 are combined in a modulo 2 adder 43 and fed back to the first stage. It will now be appreciated by those of skill in the art that the just recited arrangement is effective to generate a sequence of length N, where $N=(2^n-1)=127$. The contents of each stage of the shift register 41 are sequentially shifted through the register 41 in response to a clock signal from the waveform generator 31 (FIG. 1). The clock signals are applied to the shift register 41 via a gate 45 which is provided to inhibit the clock signals at the end of each sequence of N-bits. To that end, the clock signals are also applied to a counter 47 that maintains a running count of the clock pulses during each sequence. The count from the counter 47 is continuously applied to a comparator 49 wherein it is compared to the number N, obtained from an address register 51. When the count from the counter 47 has reached N, the comparator 49 provides an inhibit signal to the gate 45, causing that gate to open to inhibit the passage of clock signals to the shift register 41. It should be noted here that the clock signals to the shift register 41 are inhibited at the end of the N-bit sequence in order thereby to provide an aperiodic code to the transmitter 21 (FIG. 1).

In the contemplated signal processing technique for reducing or cancelling range sidelobes, the received pulse is correlated against a reference code that has been extended by M bits, where M is the number of sidelobes to be cancelled. In order to generate the requisite (N+M) reference code, the number N+M is also stored in the address register 51. In the receive mode, the radar control computer 39 (FIG. 1) causes the N+M number from the address register to be passed to the comparator 49. The latter then does not provide an inhibit signal to the gate 45 until a total of N+M clock signals has occurred. Within the shift register 41 the additional M clock signals cause the first M bits of the N-bit code to be repeated, thereby providing an N+M bit reference code to the digital correlator 35 (FIG. 1). Within the latter the N+M reference code is stored within registers (not shown) to compensate for the propagation time delay of the transmitted pulse.

Referring back now for a moment to FIG. 1, it should be noted that although the R.F. receiver 17 provides both I and Q output signals corresponding to each of the three monopulse channels, for the sake of convenience only the processing of the I and Q signals in the sum channel through both the A/D converter 33 and the digital correlator 35 will be described in detail. It will be appreciated that the processing of the difference channel data through those devices will be identical to that of the sum channel data.

Referring now to FIG. 3, the I and Q signals in the sum channel are passed to the A/D converter 33 (made up of A/D 33I and A/D 33Q) which here is a 4-bit device operating at a rate of 50 MHz. In order to attain such a rate the I and Q signals are "ping-ponged" in a known manner between a pair of 4-bit A/D converters 55I, 57I, each of which is clocked at a rate of 25 MHz by clock signals from the waveform generator 31 (FIG. 1) and a pair of first-in, first-out buffer shift registers (FIFO 59I, 61I). The signals out of FIFO 59I, 61I are impressed as shown on serial-to-parallel converters 63Io, 63Ie.

Before providing a detailed description of the digital correlator (made up of digital correlators 35I, 35Q) it should be noted that, for the sake of drawing convenience, the clock signals to individual ones of the digital correlators contained therein are not shown. Within the digital correlator 35I the I signals from the A/D converter 33I are passed to a bank (not numbered) of digital correlators. A total of twelve digital correlators (here Model TDC1023J devices from TRW LSI Products, El Segundo, Calif.) are required in each of the I channels (not numbered) of the digital correlator 35I. Because each one of such type of digital correlator is a 64-bit device, a total of three serially connected digital correlators $65I_1$, $67I_1$, $69I_1$ is required to store the 191 (127+64) bit reference code and four rows of such digital correlators are required to correlate the 4-bit I signal. The most significant bit (MSB) of the input I signal, which corresponds to the sign bit, is loaded into digital correlators $65I_1$, $67I_1$, $69I_1$, respectively. The next most significant bit is loaded into digital correlators designated with the subscript 2, and so on. As is known, each one of the 64-bit model TDC1023J digital correlators contains two independently clocked shift registers, a reference holding latch, a masking register and a summer so that correlation and loading may take place simultaneously and "no compare" bit positions may be selected. The contents of one register (designated the "A" register) and the reference holding latch (designated the "R" latch) are compared bit-for-bit by exclusive OR circuits. Each exclusive OR gate provides one bit to a digital summing network. The output of each one of the digital correlators in each row thereof then is, after summing in a summer $70I_1$, $70I_2$, $70I_3$, $70I_4$, a digital word representing the sum of selected bit positions in the "A" register and "R" latch which agree at any one time.

The output from the summer $70I_4$ (representing the least significant bit (LSB)) is passed, via a divide-by-8 divider network 71I, to a summing network 77I. The output from summer $70I_3$ is passed, via a divide-by-4 divider network 73I, to a summing network 77I, and the output from summer $70I_2$ is passed, via a divide-by-2 divider network 75I, to the summing network 77I. The output from summer $70I_1$ (representing the most significant bit (MSB) is passed directly to the summing network 77I. It should now be appreciated by those of skill in the art that the dividers 71I, 73I, 75I, are included to provide weighting. That is to say, the LSB is given one-eighth the weight of the MSB, the next LSB is given one-quarter the weight of the MSB, and finally the next LSB is given one-half the weight of the MSB. The correlated output signal from the summing network 77I then is passed to the digital signal processor 37 (FIG. 1).

Figure 4A:
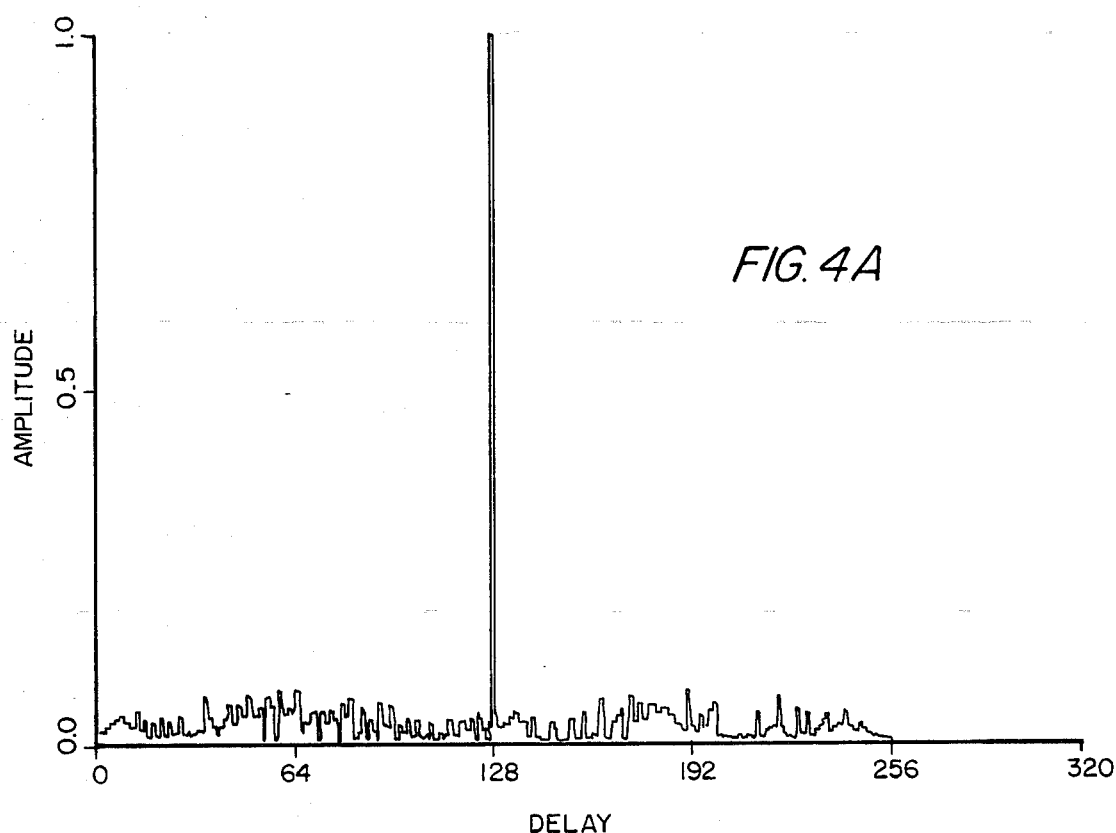
FIG. 4A is a sketch of the cross-correlation function produced by the digital correlator of FIG. 3 when correlating the N-bit transmitted code with a reference code of the same length.
Figure 4B:
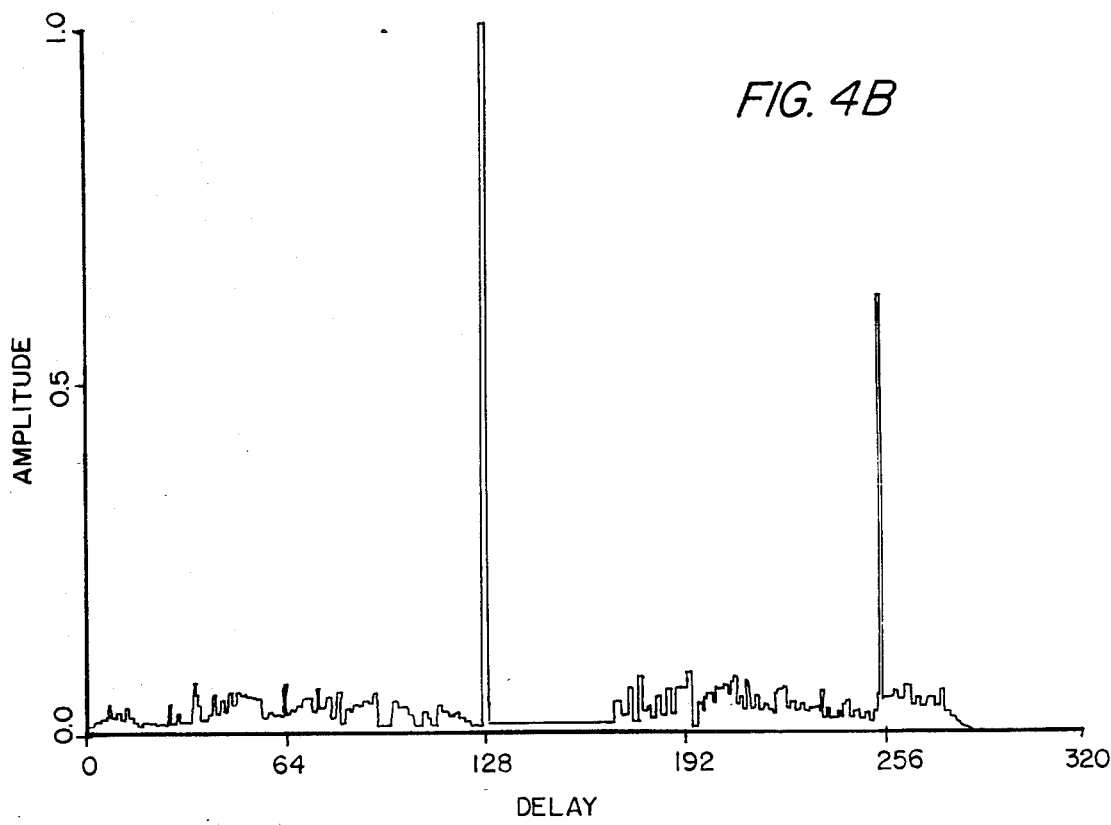
FIG. 4B is a sketch of the cross-correlation function produced by the digital correlator of FIG. 3 when correlating the N-bit transmitted code with an N+M bit reference code, illustrating the effect of sidelobe cancellation.

Referring now to FIG. 4A, the cross-correlation function produced by the digital correlator (FIG. 3) when correlating a 127 bit transmitted code with a reference code of similar length is illustrated. As would be expected, that cross-correlation function, when both the transmitted and reference codes are in perfect alignment, exhibits a peak with equal amplitude sidelobes disposed on either side of such peak. The number of sidelobes on either side of the peak is equal to the number of bits in the code. For comparison purposes, the cross-correlation function produced by the digital correlator (FIG. 3) when correlating a 127 bit transmitted code with a 191 bit reference code is illustrated in FIG. 4B. This cross-correlation function exhibits both a major and a minor peak, the minor peak being half the amplitude of the major peak. The first 64 sidelobes to the right of the major peak are, however, reduced, while those to the left of the major peak are unaltered. The energy contained in the reduced sidelobes has been transferred to the minor peak (rather than to the major peak) and the remaining sidelobes contiguous with the minor peak.

In following the contemplated signal processing technique, noise performance is degraded, but there is no loss in resolution. The noise loss is due to adding M (64) excess noise samples to the N (127) required for correlation and, therefore, the loss in signal-to-noise is proportional to the number of sidelobes cancelled. It should be noted, however, that the contemplated processing technique provides an advantage in the presence of distributed clutter, the returns from which will enter the radar system through the sidelobes as well as the main lobe. Weighting techniques, which are normally used to reduce range sidelobes, magnify the clutter around the main lobe, which results in poorer resolution. The sidelobe cancellation technique described herein increases the clutter away from the main lobe and thereby does not result in a loss in resolution.

From the foregoing, it should now be apparent that if M sidelobes on either side of the correlation peak are desired to be reduced, one could simply add another 64 bit correlator to each of the channels within the digital correlator (FIG. 3) and provide a reference code of length N+2M where M bits precede and M bits follow the N bit code. In this instance, the M bits preceding the N bit code correspond to the last M bits of the N bit code, and, conversely, the M bits following the N bit code correspond to the first M bits of the N bit code. Obviously, in order to generate such a reference code a modification of the waveform generator would be required in order to pass the last M bits of the N bit code provided to the transmitter 21 (FIG. 1) to the digital correlator (FIG. 3) followed by the N+M bit reference code generated as described hereinabove. Such a modification could simply comprise the addition of a second gate, controlled by a control signal from the radar control computer 39 (FIG. 1), to pass the last M bits of the N bit transmitter code to the digital correlator (FIG. 3).

It should also be noted here that although the contemplated sidelobe reduction technique was described in conjunction with the use of a binary coded waveform, the contemplated technique will perform equally well with either a polyphase coded waveform or a linear FM (chirp) waveform. That is to say, the contemplated sidelobe reduction technique will work with any coded waveform that has the proper symmetry (i.e., any coded waveform wherein the leading and trailing sidelobes are 180° out-of-phase).

Having described a preferred embodiment of this invention, it will be apparent to one of skill in the art that changes and modifications may be made without departing from the inventive concept. Thus, for example, the "ping-ponged" A/D converters 33I and 33Q.(FIG. 3) as well as the serial-to-parallel converters 63Io, 63Ie may all be replaced by a pair of 4 bit, 50 MHz A/D converters. It is felt, therefore, that coverage should not be limited to the disclosed embodiment, but rather should be limited only by the spirit and scope of the appended claims.

What is claimed is:

1. In a phase-coded pulse compression radar transmitting an N-bit sequence of pulses to provide an aperiodic coded signal, an arrangement for processing echo signals to suppress selected range sidelobes, such arrangement comprising:
    (a) a waveform generator, actuable during each interval between coded transmitted signals, for forming a first set of N+M digital numbers, such set consituting a reference code representative of the complete N-bit sequence of pulses followed by the first M bits of such sequence, where M is an integer, less than N, corresponding with the number of sidelobes to be cancelled;
    (b) analog-to-digital converter means, responsive to the echo signal and signals in the range sidelobes, for forming a second set of digital numbers representing the echo signal and signals in all range sidelobes; and
    (c) digital correlator means, responsive digit by digit, to the first and the second set of digital numbers to produce a third set of digital numbers representative of the echo signal and the signals in all range sidelobes, less the signals in the selected range sidelobes.

2. The arrangement as in claim 1 having, additionally, means for weighting the digital numbers out of the digital correlator means.

* * * * *